(No Model.)
E. H. GRENET.
WHEEL TIRE.
No. 501,588.   Patented July 18, 1893.
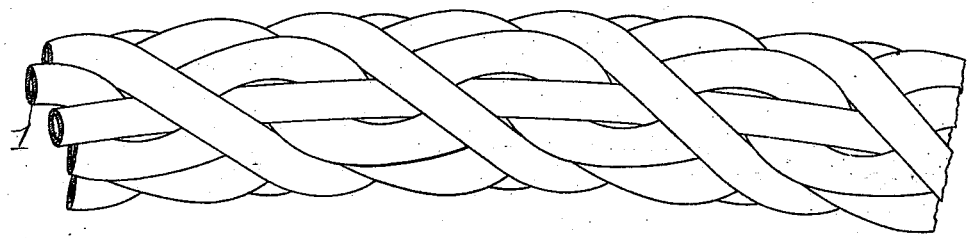
Witnesses:
E. K. Sturtevant
E. R. Bolton
Inventor:
Emile Henri Grenet,
by Richardson
attys.

UNITED STATES PATENT OFFICE.

EMILE HENRI GRENET, OF PARIS, FRANCE.

WHEEL-TIRE.

SPECIFICATION forming part of Letters Patent No. 501,588, dated July 18, 1893.

Application filed October 26, 1892. Serial No. 450,049. (No model.)

*To all whom it may concern:*

Be it known that I, EMILE HENRI GRENET, a citizen of the Republic of France, and a resident of Paris, in the Republic of France, have invented certain new and useful Improvements in Velocipede and other Wheel Tires; and I do hereby declare that the following is a full, clear, and exact description of the invention, which will enable others skilled in the art to which it appertains to make and use the same, reference being had to the accompanying drawing, which forms a part of this specification, and in which the figure illustrates the invention made up cablewise.

It is well known that the object in making cycle tires elastic is to diminish as far as possible the shocks and shaking which are so fruitful a cause of fatigue to riders. This was the object of the pneumatic tire which is however characterized by the drawback of being easily cut and collapsed.

The present invention accomplishes the object of the pneumatic tire while it avoids the drawback attending the use of the latter.

This improved tire consists of several tubes 1 of india rubber or other suitable material; the said tubes being united by being made up cablewise or twisted or plaited together in any number and to any suitable contour. The advantage of such a construction is easily understood. Under the rider's weight, the tubes of which the tire is composed, not being solid one with each other, are as to some of them pressed in between the others while the latter are spread apart, thus producing a yielding and compression similar to that which a pneumatic tire undergoes under the same circumstances; and, by virtue of their elasticity resume their normal position as soon as they pass the line of pressure. It must be pointed out that the said tubes may be made of any desirable section, round, square, oval, &c., as may be convenient, as well as of any suitable material.

A tire made according to the present invention may be covered with wire or other woven fabric, in whole or in part with an india rubber tube, or with any other suitable or well known covering without departing from the scope of the present invention which is defined in the claim at the foot hereof.

Having now particularly described and ascertained the nature of my said invention and in what manner the same is to be performed, I declare that what I claim is—

A tire for a velocipede consisting of a series of tubes interwoven together, substantially as described.

In testimony that I claim the foregoing as my own I have hereunto affixed my signature in presence of two witnesses.

EMILE HENRI GRENET.

Witnesses:
MAURICE CORREYER,
R. M. HOOPER.